(12) United States Patent
Carpelan

(10) Patent No.: US 7,317,704 B2
(45) Date of Patent: Jan. 8, 2008

(54) METHOD OF ASSIGNING RADIO CHANNELS IN WIRELESS NETWORK

(75) Inventor: Paulus Carpelan, Helsinki (FI)

(73) Assignee: Wi-LAN, Inc., Ottawa, Ontario (CA)

( * ) Notice: Subject to any disclaimer, the term of this patent is extended or adjusted under 35 U.S.C. 154(b) by 712 days.

(21) Appl. No.: 09/851,436

(22) Filed: May 9, 2001

(65) Prior Publication Data

US 2001/0046216 A1    Nov. 29, 2001

(30) Foreign Application Priority Data

May 12, 2000 (FI) .................................. 20001138

(51) Int. Cl.
*H04Q 7/00* (2006.01)
(52) U.S. Cl. ...................... 370/329; 455/450
(58) Field of Classification Search ................ 370/328, 370/329, 330, 338, 436, 437; 455/450, 453, 455/454, 509
See application file for complete search history.

(56) References Cited

U.S. PATENT DOCUMENTS

| | | | | |
|---|---|---|---|---|
| 5,448,751 A | | 9/1995 | Takenaka et al. | |
| 5,692,031 A | * | 11/1997 | Sharp et al. | 455/411 |
| 5,848,095 A | * | 12/1998 | Deutsch | 375/133 |
| 5,884,145 A | * | 3/1999 | Haartsen | 455/63.2 |
| 5,903,843 A | | 5/1999 | Suzuki et al. | |
| 5,933,420 A | | 8/1999 | Jaszewski et al. | |
| 6,047,175 A | | 4/2000 | Trompower | |
| 6,178,329 B1 | | 1/2001 | Chao et al. | |
| 6,266,332 B1 | * | 7/2001 | Koivu | 370/336 |
| 6,539,228 B1 | * | 3/2003 | Tateson | 455/446 |
| 6,606,499 B1 | * | 8/2003 | Verrier et al. | 370/332 |
| 6,694,141 B1 | * | 2/2004 | Pulkkinen et al. | 455/454 |
| 2002/0027894 A1 | * | 3/2002 | Arrakoski et al. | 370/338 |

* cited by examiner

*Primary Examiner*—Chi Pham
*Assistant Examiner*—Anh-Vu Ly
(74) *Attorney, Agent, or Firm*—Fenwick & West LLP

(57) ABSTRACT

The present invention relates to a method of assigning radio channels to a set of base stations in a wireless network, in which method one radio channel out of a determined set of radio channels is assigned to each base station. In order for different networks not to interfere with each other, the available radio channels are assigned to the set of base stations upon manufacture of the base stations such that each radio channel appears substantially an equal number of times.

2 Claims, 2 Drawing Sheets

METHOD OF ASSIGNING RADIO CHANNELS IN WIRELESS NETWORK

BACKGROUND OF THE INVENTION

The present invention relates to wireless local area networks and particularly to assigning radio channels therein.

Wireless local area networks (WLAN) comprise terminals, such as portable computers provided with WLAN cards and communicating on a radio wave via a base station. A base station creates a wireless local area network around itself whose coverage is about 20 to 50 m. In Europe, wireless local area networks have 13 radio channels at their disposal, one of which the base station determines to be used for local area network communication. Each wireless local area network also has to have a special network name, which is a common identifier of the base station and the terminals coupled to the network.

A solution is previously known, wherein base stations of wireless local area networks are provided with certain default settings at the manufacturing stage, whereby for example the same radio channel is selected as the default value for all base stations.

The problem in the above solution is interference between adjacent wireless local area networks. For example, in an apartment house environment, several separate wireless local area networks may be located at short distances from each other. If in this case the same radio channel is set to be used by the base stations, a situation arises wherein interference impairs the performance of the networks. In this case, the default channel is over-loaded and the other channels are not used. End users are not always capa-ble of changing channel settings and are not aware of the settings of surrounding interfering networks. This problem exists particularly in a home and small office environment. In larger companies, the situation is better since networks and channel assignment are generally carefully planned. Furthermore, an ex-pert IT organization often maintains the networks, whereby no problems arise in reassignment of channels.

BRIEF DESCRIPTION OF THE INVENTION

The object of the invention is to solve the above problems by providing a user-friendlier solution enabling efficient utilization of different radio channels without such subsequent reassignment of radio channels that would require special knowledge. This object is achieved by a method of assigning radio channels to a set of base stations in a wireless network, in which method one radio channel out of a determined set of radio channels is assigned to each base station. The method is characterized by assigning available radio channels to the set of base stations during manufacture of the base stations in such a way that each radio channel occurs substantially an equal number of times.

The invention is based on the idea of assigning radio chan-nels to base stations before they are taken into use such that all available ra-dio channels are used equally. This minimizes interference between adjacent wireless networks, because in practice, base stations are likely to be distrib-uted such that adjacent base stations do not use the same radio channel. This ensures network performance for a large number of terminals.

A first preferred embodiment of the inventive method first de-termines a given order for the radio channels. A first base station is then selected and one available radio channel is assigned thereto. Next, a second base station is selected, and the radio channel having the next order number is assigned thereto or, if the radio channel assigned to the first base station has the largest order number in the determined set of radio channels, then the radio channel having the smallest order number is assigned. Radio channels are assigned in this way according to order numbers in an ascending or de-scending order until radio channels are assigned to the entire set of base sta-tions. This assignment of radio channels can be implemented with a simple counter for example such that a radio channel is selected for a first device in a production lot, and channels are then counted forward for each device manu-factured. When the order number of a channel reaches a highest allowed order number, the next device is assigned the channel having the lowest allowed order number.

In a second preferred embodiment of the inventive method, a radio channel selected randomly out of a determined set of radio channels is assigned to a first base station. In this case, the starting order number is not always for example one, which would lead to a situation wherein radio chan-nels having the number one would be in use the most, but radio channels are distributed as evenly as possible to the entire available channel domain.

In a third preferred embodiment of the inventive method, a radio channel derived out of a determined set of radio channels based on an individual serial number is assigned to each base station. This allows for ex-ample the use of the last two numbers of the serial number of the base station for indicating the order number of the radio channel to be assigned.

In a fourth preferred embodiment of the invention, radio channels are assigned to all base stations randomly. This is likely to ensure that radio channels are evenly assigned to a large number of devices.

The preferred embodiments of the inventive method are dis-closed in the attached dependent claims.

BRIEF DESCRIPTION OF THE FIGURES

In the following, the invention will be described by way of ex-ample with reference to the attached figures, in which.

DETAILED DESCRIPTION OF THE INVENTION

Figure 1:
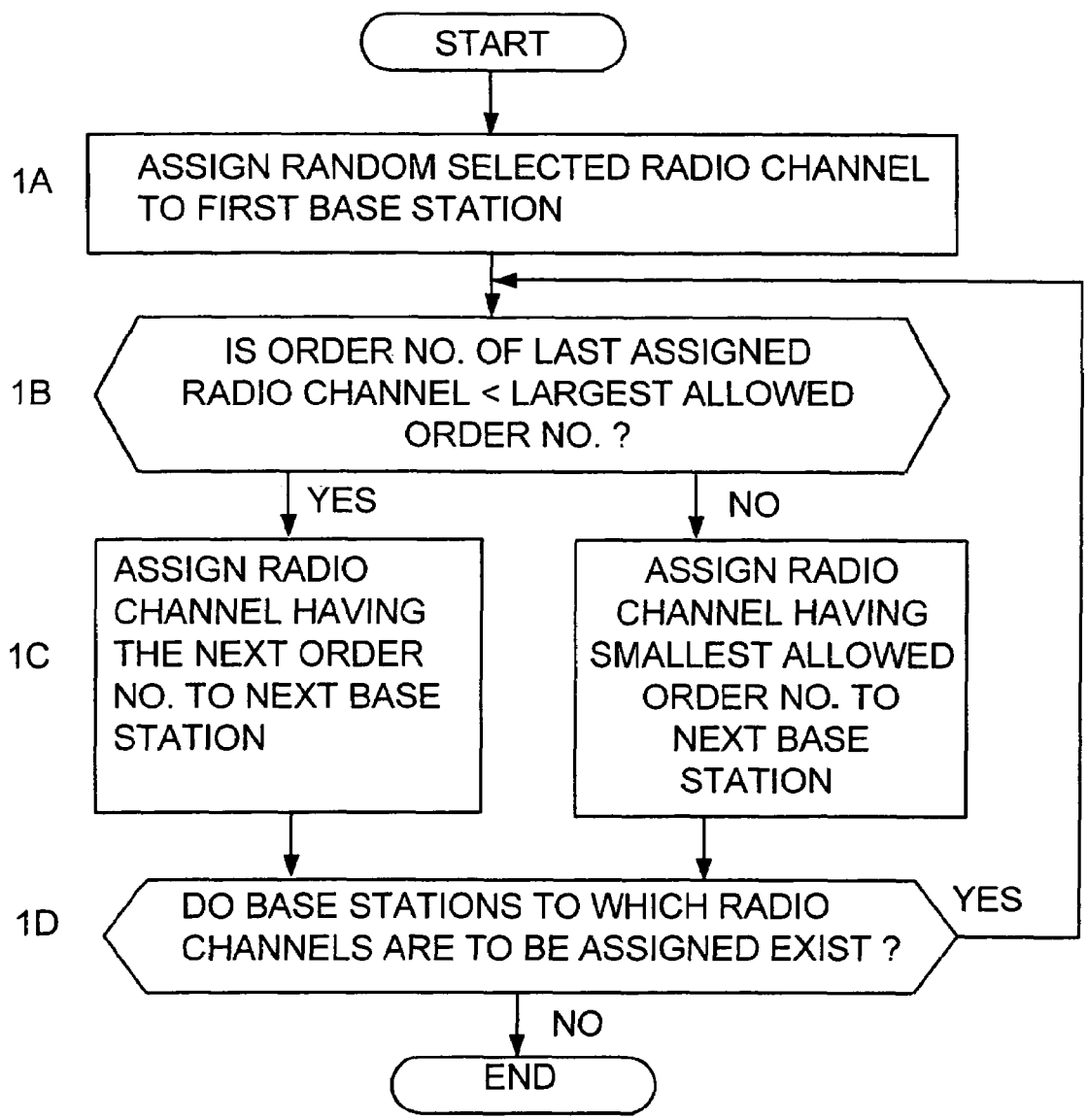
FIG. 1 is a flow chart of the method of the invention.

FIG. 1 is a flow chart of the method of the invention. Let us assume by way of example that a production lot involving base stations for wireless networks delivered to Europe is concerned, the number of available radio channels being 13 and the radio channels being numbered from one to 13. In step 1A, a randomly selected radio channel is assigned to a first base station. In step 1B, a check is made to see if the order number of this base station is smaller than the largest allowed order number, i.e. less than 13. If the order number of the assigned radio channel is less than 13, the next radio channel in order is assigned to the next base station in step 1C. If the order number of the assigned radio channel is not less than the largest allowed order number, i.e. 13, but equal to 13, a radio channel whose order number is the smallest allowed, i.e. in this example one, is assigned to the next base sta-tion in step 1C. This way radio channels are assigned in order until the end of the production lot. In step 1D, a check is made to see if base stations to which radio channels are to be assigned still exist. If so, the process returns to step 1B. If not, the radio channel assignment process ends.

Figure 2:
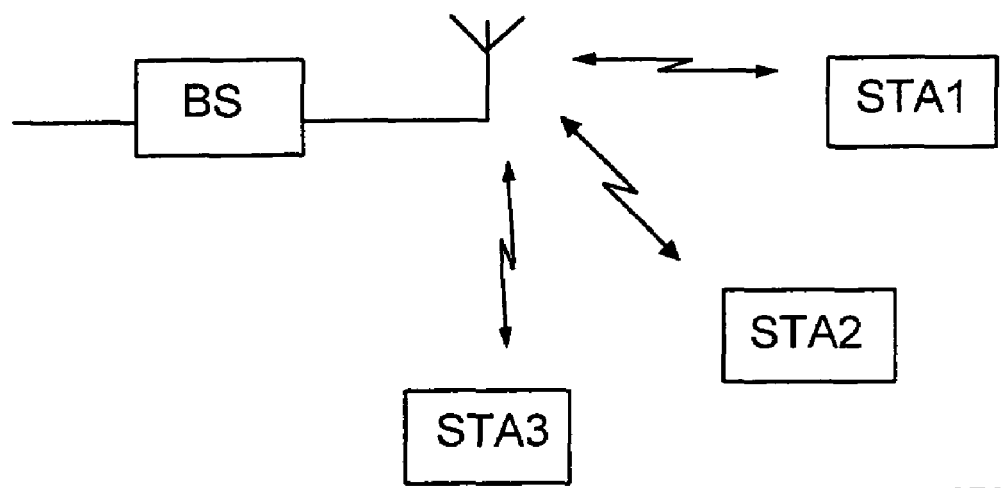
FIG. 2 is a block diagram of a system to which the inventive method is applicable.

FIG. 2 is a block diagram of a system to which the inventive method is applicable. The wireless local area network shown comprises a base station BS and terminals STA1, STA2, STA3, which have a radio chan-nel connection to the base station BS. The base station may be an ADSL ter-minal (Asymmetric Digital Subscriber Line), enabling a fast Internet connec-tion. Such a wireless local area network is typically located at a home or a small office. The terminals STA1, STA2, STA3 may be for example portable computers having a local area network card or household appliances con-trolled from the network.

Let us assume that before delivery an individual network name and a certain radio channel to be used are set at the factory as default values for the base station BS. Before the terminals STA1, STA2, STA3 can be coupled to the network, the same network name has to be given to the ter-minals STA1, STA2, STA3. The network name of the base station BS, the name being e.g. part of a running serial number, can be read from a sticker attached to the base station BS and input in the terminals STA1, STA2, STA3. Once the base station BS is switched on, it starts to send a signal on the se-iected radio channel. At this point, the terminals STA1, STA2, STA3 are un-aware of the radio channel selected, since at the factory, radio channels are assigned to base stations such that all radio channels are used equally in the entire production lot. Once the same network name is input in the terminals STA1, STA2, STA3 as is in the base station BS, the terminals STA1, STA2, STA3 detect the signal including the network name sent by the base station BS and use it to find the radio channel employed for communication. This is carried out by the terminals STA1, STA2, STA3 going systematically through all available radio channels until they find the channel on which their network name appears.

The above method of selecting a radio channel and a net-work name aims at optimal network performance by minimizing intra-network interference. An individual net-work name and equal use of all radio channels minimizes the probability of interference between adjacent wireless local area network.

It is to be understood that the above specification and the re-lated figures are only intended to illustrate the present invention. Different variations and modifications of the invention are apparent to those skilled in the art, without deviating from the scope and spirit of the invention dis-closed in the attached claims.

The invention claimed is:

1. A method of assigning radio channels to a set of base stations in a wireless network, comprising:
   determining a set of radio channels to include all radio channels which said set of base stations have at their disposal for communication, and
   assigning one radio channel out of said determined set of radio channels to each base station during manufacture of the base stations in such a way that each radio channel in said determined set of radio channels is assigned substantially an equal number of times, said assigning comprising:
      determining a given order for the radio channels,
      selecting a first base station and assigning one available radio channel thereto, selecting a second base station and assigning a radio channel having the next order number thereto or, if the radio channel assigned to the first base station has the largest order number out of the determined set of radio channels, assigning a radio channel having the smallest order number thereto, and
      continuing assigning radio channels according to order numbers in an ascending or descending order until radio channels are assigned to the entire set of base stations.

2. A method of assigning radio channels to a set of base stations in a wireless network, comprising:
   determining a set of radio channels to include all radio channels which said set of base stations have at their disposal for communication, and
   assigning one radio channel out of said determined set of radio channels to each base station during manufacture of the base stations in such a way that each radio channel in said determined set of radio channels is assigned substantially an equal number of times, said assigning comprising:
      assigning a radio channel derived on the basis on an individual serial number of the base station out of the determined set of radio channels to each base station.

* * * * *